Patented Oct. 5, 1948

2,450,615

UNITED STATES PATENT OFFICE 2,450,615

METHOD OF REDUCING SCALD DEVELOPMENT ON FRUIT

Harold A. Schomer, Cedar Lane, Md., assignor to the United States of America as represented by the Secretary of Agriculture No Drawing. Application July 19, 1946, Serial No. 684,913

11 Claims. (Cl. 99—156)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the storage of fruits, such as apples, and pears, and is more particularly concerned with the reduction of scald development on such fruits during storage.

One method and the most widely used heretofore for reducing scald development on fruit comprises placing the stored fruit in contact with oil-impregnated paper. This invention differs from this method and other known methods in many particulars which will be described hereinafter, especially in the results obtained.

I have found that a large percentage of stored fruit when treated with certain chemicals are, after the usual cold storage periods, free from scald. This percentage is much higher than that found for similarly stored fruit that was either untreated or treated by other known methods, including shredded oil-impregnated paper.

Among the chemicals which I have found effective in the method of this invention are those generally known as plant hormones, such as $\alpha$-naphthaleneacetic acid, indolebutyric acid, $\beta$-naphthoxyacetic acid, indoleacetic acid, 2,4-dichlorophenoxyacetic acid, and naphthaleneacetamide. Other compounds of this class, indicated for use in the method of this invention, are parachlorophenoxyacetic acid, 2,4,5-trichlorophenoxyacetic acid, 4-chloro-2-methyl phenoxyacetic acid, and other halogenated monocarboxylic acids of the naphthalene, naphthoxy, phenyl, phenoxy and indolyl types.

These plant hormones may be applied to the fruit in a number of different ways, such as in solution, as a dust, as an aerosol, as an emulsion, or in the form of a vapor. They may also be applied similarly to the oil-impregnated paper technique by impregnating or coating the paper with a solution containing them and storing the fruit in contact with the paper.

The preferred method of my invention, however, comprises the use of emulsions of mineral oil base waxes or of lanolin. Lanolin itself appears to aid in reducing scald incidence, and, when the plant hormones are combined with it a very marked reduction in scald incidence results. For example, the Arkansas variety of apple (Mammoth Black Twig) is one which tends to scald severely in cold storage. Three separate lots of apples of this variety were placed in storage during the 1945-1946 season. One lot was untreated. The second lot was packed in the usual shredded oil-impregnated paper. The third lot was treated by dipping the apples in a lanolin emulsion containing 500 P. P. M. $\alpha$-naphthaleneacetic acid. At the end of the storage period, 91.4 percent of the untreated apples, 65 percent of the apples in shredded oil paper, and only 12.3 percent of the emulsion-treated apples were scalded.

A marked reduction in scald development was also obtained on Stayman Winesap apples under similar conditions. Treatments with lanolin emulsions of naphthaleneacetic acid, of indolebutyric acid, and of a mixture of equal parts naphthaleneacetic acid, indolebutyric acid, naphthoxyacetic acid, and naphthaleneacetamide at concentrations of 10, 100, and 500 P. P. M. gave scald developments of only 21.5 percent, 25.6 percent, and 17.2 percent, respectively, as compared to 62.3 percent for untreated fruit. The percentages of sound fruit for the same treatments were 70.7, 67.5 and 75.4, respectively, as against 31.1 for the untreated fruit. In conducting these tests, the fruit was first harvested from the trees and held in storage for five days thereafter at 31° F. They were then treated. Following the treatment, they were held in storage at 31° F. for a little over six months. They were then held at 70° F. for seven days and examined.

Similarly treated Grimes Golden apples resulted in a reduction in the intensity of scald as compared to untreated apples. The average percentage of severely scalded apples was 40.5 for the treated as compared to 61.9 for the untreated.

York Imperial apples treated with naphthaleneacetic acid, with indolebutyric acid, and with a mixture of naphthaleneacetic acid, indolebutyric acid, naphthoxyacetic acid, and naphthaleneacetamide at concentrations of 10, 100, and 500 P. P. M. resulted in average percentages of scalded fruits of 9.7, 7.1, and 5.1, respectively, as compared to 13.1 percent for untreated fruit under comparable conditions.

Having thus described my invention, I claim:

1. The method of reducing the development of scald on fruit during cold storage comprising maintaining the fruit in contact with a plant hormone during the storage period.

2. The method of reducing the development of scald on fruit during cold storage comprising applying to the fruit a plant hormone and maintaining the plant hormone on the fruit during the storage period.

3. The method of reducing the development of scald on fruit during cold storage comprising maintaining the fruit during storage in contact with lanolin and a plant hormone.

4. The method of reducing the development of scald on fruit during cold storage comprising maintaining the fruit in contact with naphthaleneacetic acid during the storage period.

5. The method of reducing the development of scald on fruit during cold storage comprising maintaining the fruit in contact with naphthaleneacetic acid and lanolin during the storage period.

6. The method of reducing the development of scald on fruit during cold storage comprising maintaining the fruit in contact with indolebutyric acid during the storage period.

7. The method of reducing the development of scald on fruit during cold storage comprising maintaining the fruit in contact with indolebutyric acid and lanolin during the storage period.

8. The method of reducing the development of scald on fruit during cold storage comprising maintaining the fruit in contact with a mixture of naphthaleneacetic acid, indolebutyric acid, naphthoxyacetic acid, and naphthaleneacetamide during the storage period.

9. The method of reducing the development of scald on fruit during cold storage comprising maintaining the fruit in contact with lanolin and a mixture of naphthaleneacetic acid, indolebutyric acid, naphthoxyacetic acid, and naphthaleneacetamide during the storage period.

10. The method of reducing the development of scald on apples during cold storage comprising maintaining the apples in contact with a plant hormone during the storage period.

11. A composition of matter having the property of reducing the development of scald on fruit during cold storage comprising a lanolin emulsion of a mixture of naphthaleneacetic acid, indolebutyric acid, naphthoxyacetic acid, and naphthaleneacetamide.

HAROLD A. SCHOMER.

REFERENCES CITED

The following references are of record in the file of this patent:

UNITED STATES PATENTS

| Number | Name | Date |
|---|---|---|
| 1,809,016 | Brogden | June 9, 1931 |
| 2,119,612 | Thurber | June 7, 1938 |
| 2,336,928 | Denny | Dec. 14, 1943 |
| 2,341,868 | Hitchcock et al. | Feb. 15, 1944 |
| 2,344,151 | Kasser | Mar. 14, 1944 |
| 2,374,620 | Prinz | Apr. 24, 1945 |